(12) United States Patent
Yamanaka et al.

(10) Patent No.: US 10,717,418 B2
(45) Date of Patent: Jul. 21, 2020

(54) AIR COMPRESSOR AND EXTRANEOUS-MATTER REMOVING APPARATUS

(71) Applicant: FUJITSU TEN LIMITED, Kobe-shi, Hyogo (JP)

(72) Inventors: Yasutaka Yamanaka, Kobe (JP); Tomohisa Koseki, Kobe (JP); Masashi Otomi, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 266 days.

(21) Appl. No.: 15/795,412

(22) Filed: Oct. 27, 2017

(65) Prior Publication Data

US 2018/0154869 A1 Jun. 7, 2018

(30) Foreign Application Priority Data

Dec. 1, 2016 (JP) ................. 2016-234295

(51) Int. Cl.
| | | |
|---|---|---|
| *B60S 1/56* | (2006.01) | |
| *F04C 21/00* | (2006.01) | |
| *F04C 25/00* | (2006.01) | |
| *G02B 27/00* | (2006.01) | |
| *B60S 1/54* | (2006.01) | |
| *F04C 29/12* | (2006.01) | |

(52) U.S. Cl.
CPC ............ *B60S 1/56* (2013.01); *F04C 21/002* (2013.01); *F04C 25/00* (2013.01); *G02B 27/0006* (2013.01); *B60S 1/54* (2013.01); *F04C 29/126* (2013.01); *F04C 2210/221* (2013.01)

(58) Field of Classification Search
CPC .......... B60S 1/56; B60S 1/54; G02B 27/0006; F04C 25/00; F04C 21/002; F04C 2210/221; F04C 29/126; F04C 29/128
USPC .......... 418/185; 417/444, 445, 441, 514, 306
See application file for complete search history.

(56) References Cited

U.S. PATENT DOCUMENTS

| | | | |
|---|---|---|---|
| 74,500 A * | 2/1868 | Chamberlin et al. | |
| 907,859 A * | 12/1908 | Neumann | |
| 1,444,577 A * | 2/1923 | Wilson | F04C 9/00 92/122 |
| 1,951,607 A * | 3/1934 | Gideon | F25B 31/00 417/481 |
| 4,027,576 A * | 6/1977 | Nomura | F15B 15/12 91/339 |

(Continued)

FOREIGN PATENT DOCUMENTS

| | | |
|---|---|---|
| GB | 511954 A | 8/1939 |
| JP | S54-30504 A | 3/1979 |

(Continued)

OTHER PUBLICATIONS

Jan. 28, 2020 Office Action issued in Japanese Patent Application No. 2016-234295.

*Primary Examiner* — Charles G Freay
(74) *Attorney, Agent, or Firm* — Oliff PLC

(57) ABSTRACT

An air compressor according to an embodiment, which includes a cylinder and a rotating body provided to be rotatable around a rotation axis in the cylinder so as to generate compressed air through intake and exhaustion caused by rotation of the rotating body, includes an intake valve. The intake valve takes air in the intake and exhaustion. The intake valve is provided in the cylinder.

8 Claims, 11 Drawing Sheets

(56) References Cited

U.S. PATENT DOCUMENTS

| | | | | |
|---|---|---|---|---|
| 4,459,085 | A * | 7/1984 | Tonegawa | B60T 1/12 |
| | | | | 417/282 |
| 6,109,886 | A * | 8/2000 | Schonfeld | F04B 49/243 |
| | | | | 417/298 |
| 7,931,006 | B1 | 4/2011 | Kamenov | |
| 7,931,452 | B2 * | 4/2011 | Hibino | F04B 27/1018 |
| | | | | 137/493.9 |

FOREIGN PATENT DOCUMENTS

| | | |
|---|---|---|
| JP | 2014-037239 A | 2/2014 |
| WO | WO 2004/088141 | * 10/2004 |

* cited by examiner

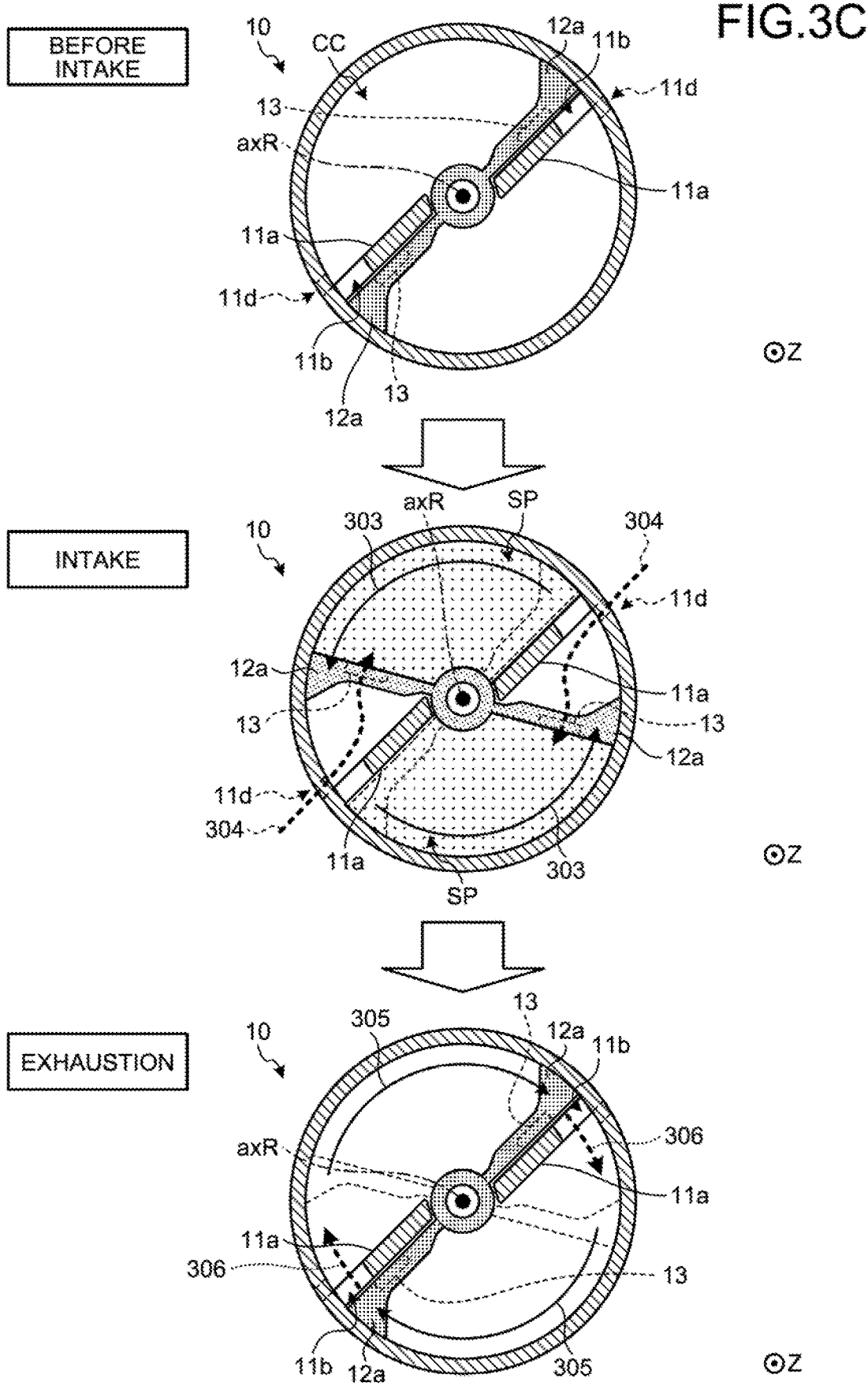

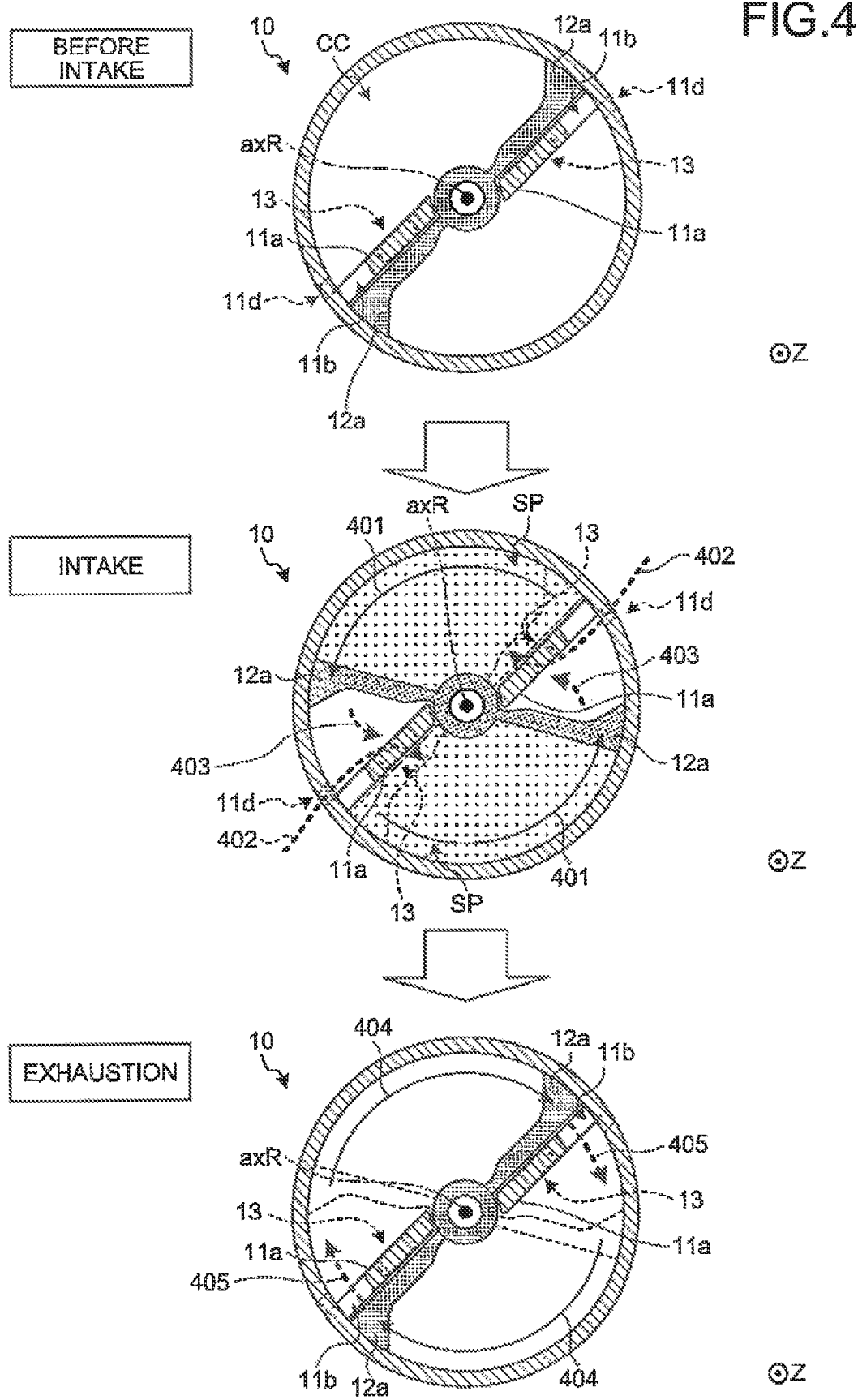

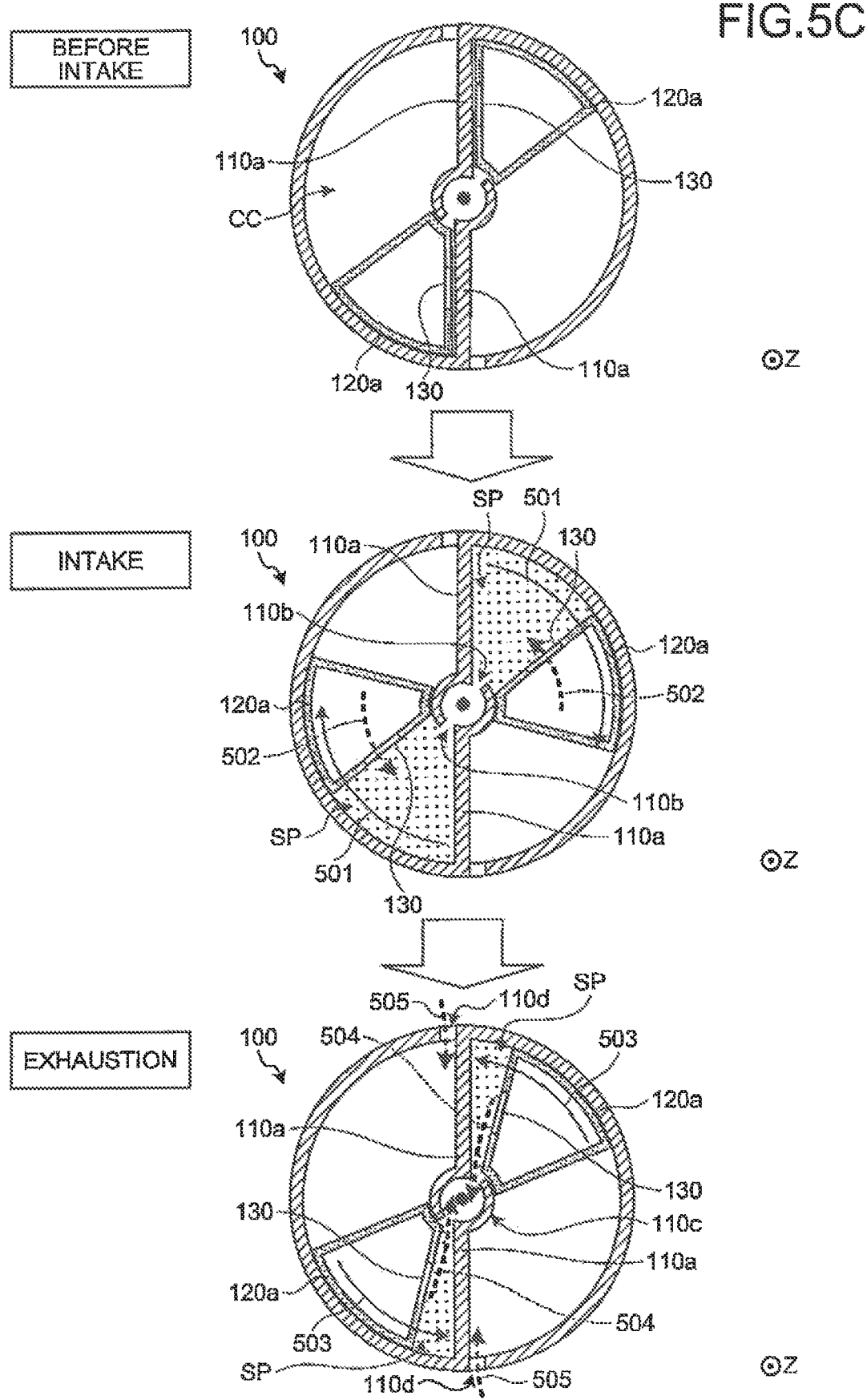

AIR COMPRESSOR AND EXTRANEOUS-MATTER REMOVING APPARATUS

CROSS-REFERENCE TO RELATED APPLICATION

This application is based upon and claims the benefit of priority of the prior Japanese Patent Application No. 2016-234295, filed on Dec. 1, 2016, the entire contents of which are incorporated herein by reference.

FIELD

The embodiments discussed herein are directed to an air compressor and an extraneous-matter removing apparatus.

BACKGROUND

Conventionally, there is known a camera that is provided in a vehicle so as to capture a vicinity of this vehicle. An image captured by this camera is, for example, displayed on a monitor for visibility auxiliary of a driver and used in sensing for detecting white lines on a road, an object approaching the vehicle, etc.

An extraneous matter such as a raindrop, a snowflake, dust, and mud is adhered to a lens of this camera to become an obstacle to the above visibility auxiliary and sensing, in some cases. Therefore, in recent years, there is proposed an extraneous-matter removing apparatus that ejects a compressed air toward the lens of the camera so as to remove the extraneous matter (see Japanese Laid-open Patent Publication No. 2014-037239, for example).

However, the aforementioned conventional technology has room for improvement in ensuring excellent air-compression performance by a simple configuration.

Specifically, in generating compressed air, there exists a case where an intake route as well as an exhaustion route is arranged on a aide of a nozzle for ejecting the compressed air in order to perform a series of cycles including intake and exhaustion, for example.

In this case, there exists a case where an intake valve and an exhaust valve are provided as check valves between a cylinder chamber, in which air is compressed, and the nozzle so as to prevent an extraneous matter other than air from entering therein from a nozzle side. In other words, the case is for preventing the extraneous matter from entering the cylinder chamber so as to prevent a malfunction and ensure the air-compression performance.

However, when the intake valve and the exhaust valve are provided between the cylinder chamber and the nozzle, a mechanism becomes complicated and further a passage resistance of air becomes large, and thus there exists a fear that an ejection force of the compressed air ejected from the nozzle is reduced by a pressure loss in the exhaust valve, for example.

SUMMARY

An air compressor according to an aspect of an embodiment, which includes a cylinder and a rotating body provided to be rotatable around a rotation axis in the cylinder so as to generate compressed air through intake and exhaustion caused by rotation of the rotating body, includes an intake valve. The intake valve takes air in the intake and exhaustion. The intake valve is provided in the cylinder.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIG. 3C is a diagram illustrating a specific flow of intake and exhaustion of the air compressing part;

FIG. 4 is a diagram illustrating a specific flow of intake and exhaustion of the air compressing part when the intake valves are arranged in cylinder walls;

FIG. 5C is a diagram illustrating a specific flow of intake and exhaustion of an air compressing part according to the other embodiment.

DESCRIPTION OP EMBODIMENTS

Hereinafter, embodiments of an air compressor and an extraneous-matter removing apparatus according to the present application will be described in detail with reference to the accompanying drawings. The present disclosure is not limited to the embodiments described in the following.

Hereinafter, an example will be explained, in which an extraneous-matter removing apparatus is an apparatus that is provided in a vehicle so as to remove an extraneous matter adhered to a camera for capturing the vicinity of the vehicle.

Hereinafter, outline of a configuration of an extraneous-matter removing apparatus 1 according to the present embodiment will be explained with reference to FIGS. 1A to 1D, and then a more specific configuration of the extraneous-matter removing apparatus 1 according to the present embodiment will be explained with reference to FIG. 2A and the following.

Figure 1A:
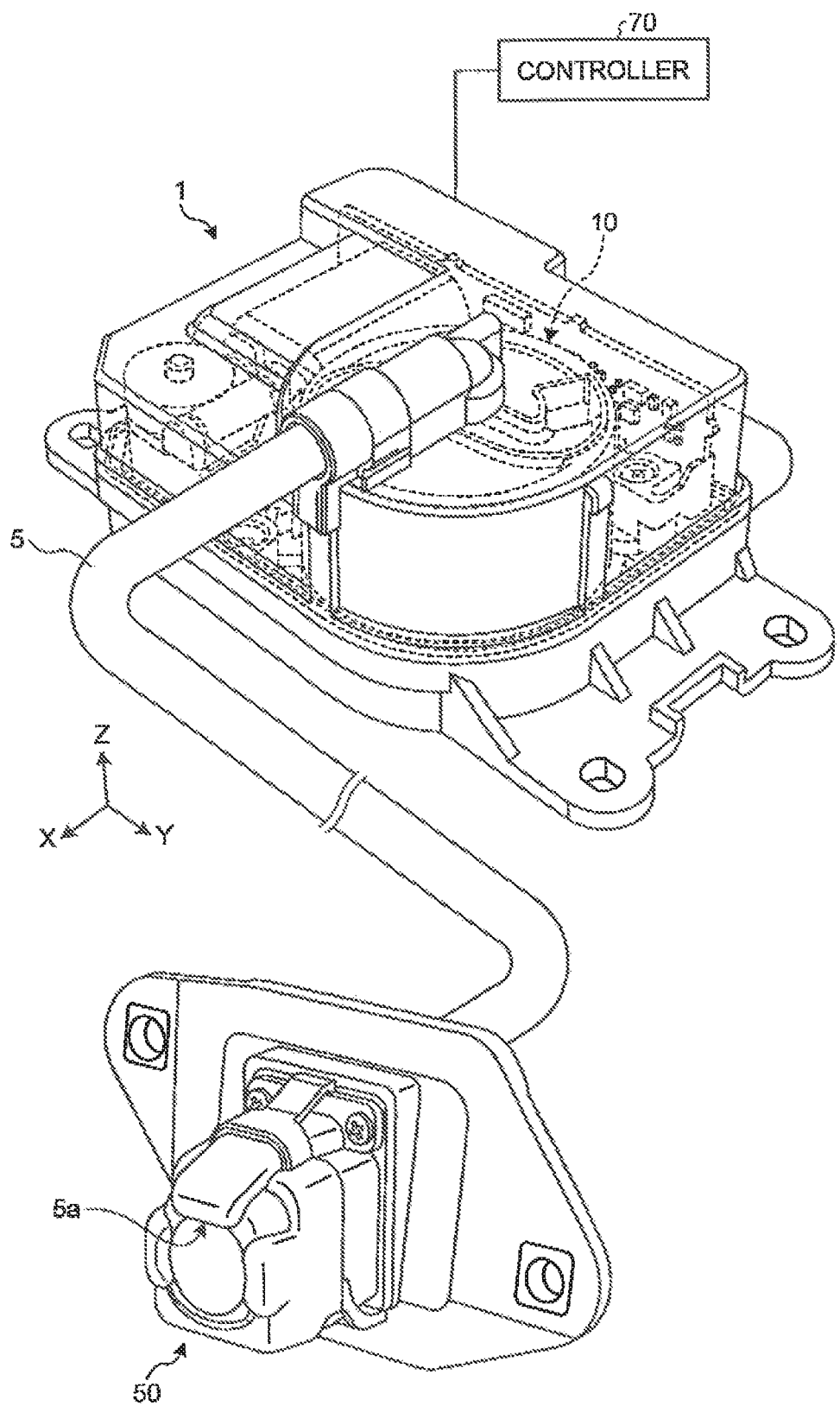
FIG. 1A is a see-through perspective view illustrating an extraneous-matter removing apparatus according to an embodiment.
Figure 1B:
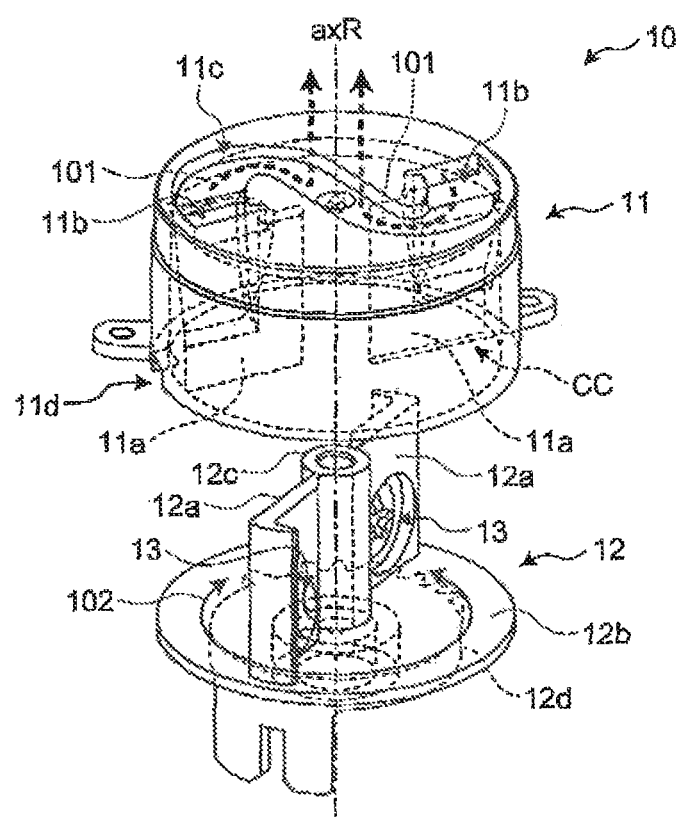
FIG. 1B is a see-through perspective view illustrating an air compressing part.
Figure 1C:
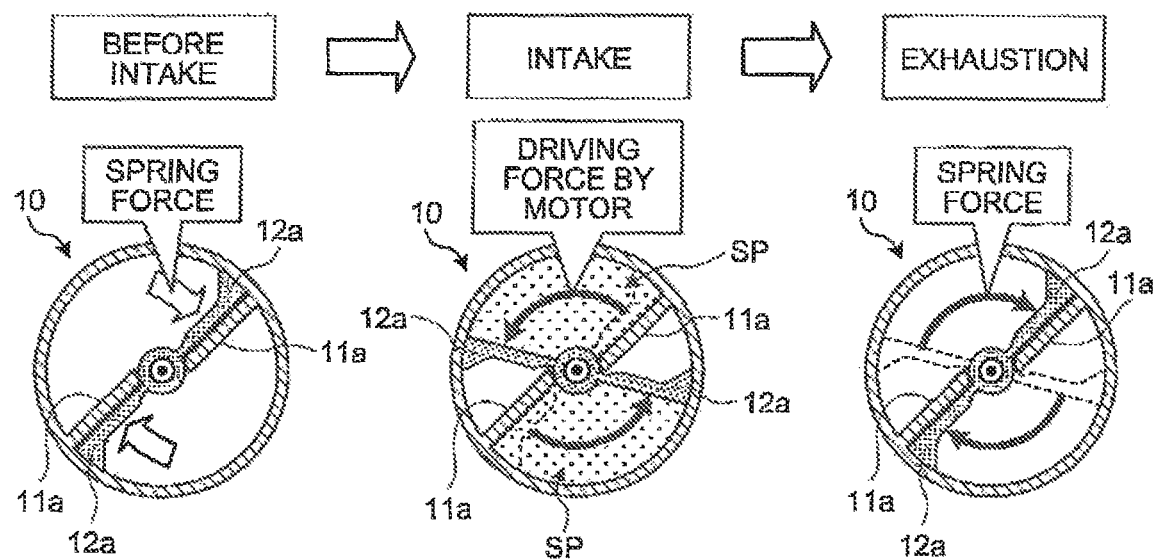
FIG. 1C is a diagram explaining operations of the air compressing part.
Figure 1D:
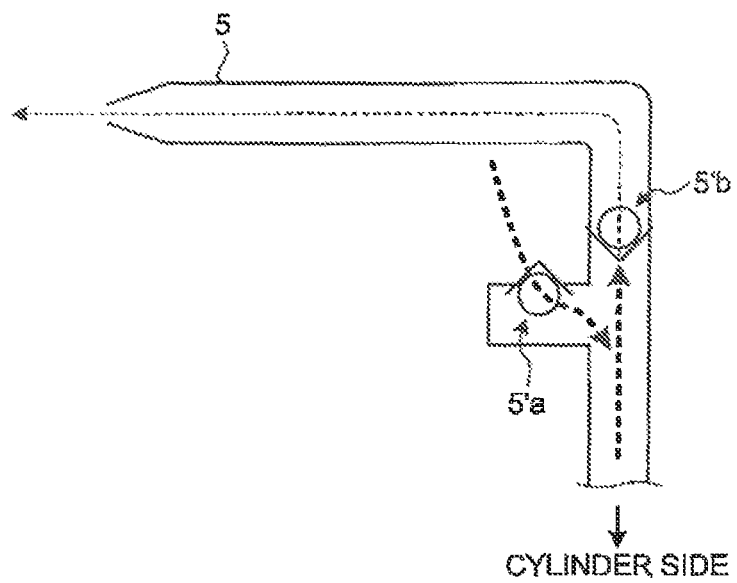
FIG. 1D is a diagram explaining a case where there exists check valves between a nozzle and a cylinder.

FIG. 1A is a see-through perspective view illustrating the extraneous-matter removing apparatus 1 according to the present embodiment. FIG. 1B is a see-through perspective view illustrating a configuration of an air compressing part 10. FIG. 1C is a diagram explaining operations of the air compressing part 10. FIG. 1D is a diagram explaining a case where there exists check valves between a nozzle 5 and a cylinder 11.

As illustrated in FIG. 1A, the extraneous-matter removing apparatus 1 includes the nozzle 5 and the air compressing part 10. The air compressing part 10 compresses air to generate a compressed air and ejects the generated compressed air to a vehicle camera 50 from an ejection port 5*a* through the nozzle 5, and thus removes an extraneous matter such as a raindrop adhered to a lens of the camera 50. Thus, it is possible to ensure accuracy in visibility auxiliary of a driver, sensing of an approaching object, etc.

A target whose extraneous matter is removed by the extraneous-matter removing apparatus 1 is here the camera 50, not limited thereto.

In other words, it is sufficient that the target is an optical sensor for acquiring, for example, an image through a lens, information of a target object existing in the vicinity of the vehicle, etc. Specifically, for example, the target may be various optical sensors such as a radar device for detecting a target object existing in the vicinity of the vehicle, and the detection accuracy of this optical sensor is able to be ensured.

The extraneous-matter removing apparatus 1 includes a controller 70. The controller 70 is a microcomputer including a central processing unit (CPU) and a storage (not illustrated) and controls a motor (to be mentioned later) so as to cause the air compressing part 10 to operate.

The air compressing part 10 includes a rotation-type air compressing mechanism. Specifically, as illustrated in FIG. 1B, the air compressing part 10 includes the cylinder 11 and a rotation part 12. The cylinder 11 includes cylinder walls 11*a*, communication openings 11*b*, a flow path 11*c*, and intake ports 11*d*. When provided in a vehicle, being small, light, and inexpensive is needed, and thus the cylinder 11 and the rotation part 12 are preferably formed of resin etc.

The cylinder 11 is cylindrically formed, for example, and a cylinder chamber CC is formed therein. The cylinder walls 11*a* are formed in a plate-like shape, for example, and are arranged so as to segment, along a substantially radial direction, the cylindrical cylinder chamber CC in positions to be point symmetry with a rotation axis axR as the center point. Therefore, cylinder chamber CC is segmented into two parts by the cylinder walls 11*a*.

The communication openings 11*b* are one example of an exhaust port, and are opened, near the two cylinder walls 11*a* in a ceiling part of the cylinder chamber CC, at positions to be point symmetry with the rotation axis axR as the center point so that the two segmented cylinder chambers CC are communicated with the outside of the cylinder 11. Compressed airs generated on the basis of rotation of the rotation part 12 to be mentioned later are exhausted from respective partitions of the segmented cylinder chambers CC through these communication openings 11*b*.

The flow path 11*c* is connected with the communication openings 11*b*, and is formed in a shape to be point symmetry with the rotation axis axR as the center point. The flow path 11*c* is connected with the nozzle 5 on an axis line of the rotation axis axR. The compressed airs output from the segmented cylinder chambers CC through the communication openings 11*b* are led to the nozzle 5 through this flow path 11*c* (see arrows 101 illustrated in FIG. 1B), and are ejected to the camera 50 from the ejection port 5*a* of the nozzle 5.

The intake ports 11*d* are opened in an outer wall of the cylinder 11 at positions that are substantially under the respective two communication openings 11*b* so that the outside of the cylinder 11 is communicated with the segmented cylinder chambers CC. Air that is taken on the basis of rotation of the rotation part 12 to be mentioned later is taken into the cylinder chamber CC through these intake ports 11*d*.

The rotation part 12 includes vanes 12*a*, a rotation base 12*b*, and a shaft part 12*c*. The rotation base 12*b* is formed in a round-plate-like shape, and is provided to be rotatable around the rotation axis axR (see arrow 102 illustrated in FIG. 1B).

Specifically, the rotation base 12*b* includes a driven gear 12*d* on a surface reverse to the cylinder 11 side, this driven gear 12*d* is engaged with a drive-side gear (not illustrated) connected to, for example, the motor and receives a driving force of the above motor so as to be rotated in a predetermined direction around the rotation axis axR.

In a free state of not receiving the rotation driving force from the motor, the rotation base 12*b* is biased by a spring member (not illustrated) in a direction reverse to the predetermined direction of the rotation caused by the motor.

The vanes 12*a* are formed in a plate-like shape, and are erected on a surface reverse to that on which the driven gear 12*d* is provided so as to segment, along the radial direction, the rotation base 12*b*. Each of the vanes 12*a* includes a corresponding intake valve 13 in a wall thereof. Details of the intake valves 13 will be mentioned later with reference to FIG. 2A and the following.

The shaft part 12*c* is a shaft portion for the rotation around the rotation axis axR, and is arranged between the two vanes 12*a* so as to link the two vanes 12*a*.

The rotation part 12 configured in this manner is engaged with the cylinder 11 so as to be rotated in the cylinder chamber CC, and a series of cycles including intake and exhaustion is performed so as to generate compressed air.

Specifically, as illustrated in FIG. 1C, in a state of "before intake" of the air compressing part 10, the rotation part 12 is first in a free state of not being driven by the above motor, and the vanes 12*a* are biased by "spring force" of the spring member and are in a state of being pressed against the cylinder walls 11*a*.

When the vanes 12*a* are rotated in a direction away from the cylinder walls 11*a* from this state by the "driving force by motor", rooms SP between the vanes 12*a* and the cylinder walls 11*a* are expanded and the negative pressure is generated in the rooms SP so as to take air ("intake").

When the vanes 12*a* are rotated to reach predetermined positions, the driving force of the motor is released. The vanes 12*a*, which are released from the driving force of the motor, are vigorously returned, by "spring force" of the spring member, to a state of being in contact with the cylinder walls 11*a*. In this time, the rooms SP are compressed, in other words, compressed air is generated from the air that has been taken into the rooms SF ("intake" is performed), so as to be "exhausted" in a high-pressure state from the communication openings 11*b*.

Meanwhile, in a technology according to a comparison example for the present embodiment, there exists a case where an intake route for "intake" is arranged on the nozzle 5 side along with an exhaustion route, in some cases. Specifically, as illustrated in FIG. 1D, there exists a case where a check valve 5'*a* as the intake valve and a check valve 5'*b* as the exhaust valve are arranged between the nozzle 5 and the cylinder 11, in some cases.

However, thus, an extraneous matter other than air may be prevented from entering from the nozzle side, there exists a fear that an ejection force of a compressed air ejected from the nozzle is reduced by a pressure loss at the exhaust valve, for example.

If a valve opening pressure for opening at the pressure lower than that needed for taking air from the nozzle 5 is set for the check valve 5'*a* on the intake valve side without providing the check valve 5'*b* on the exhaust valve side, there exists a fear that a mechanism becomes complicated and further a passage resistance of air becomes large.

Thus, in the present embodiment, a check valve is not arranged between the nozzle 5 and the cylinder 11 but in the cylinder chamber CC. Specifically, the intake valves 13 as the check valves are arranged on wall surfaces of the vanes 12a that are to be arranged in the cylinder chamber CC when the cylinder 11 and the rotation part 12 are engaged with each other.

Hereinafter, more specific configuration of the extraneous-matter removing apparatus 1 according to the present embodiment including this point will be sequentially explained with reference to FIG. 2A and the following. FIG. 2A is a perspective view illustrating a configuration of the rotation part 12. FIG. 2B is a perspective view illustrating a configuration of one of the intake valves 13. FIG. 2C is a lateral-cross-sectional view illustrating one of the intake valves 13.

Figure 2A:
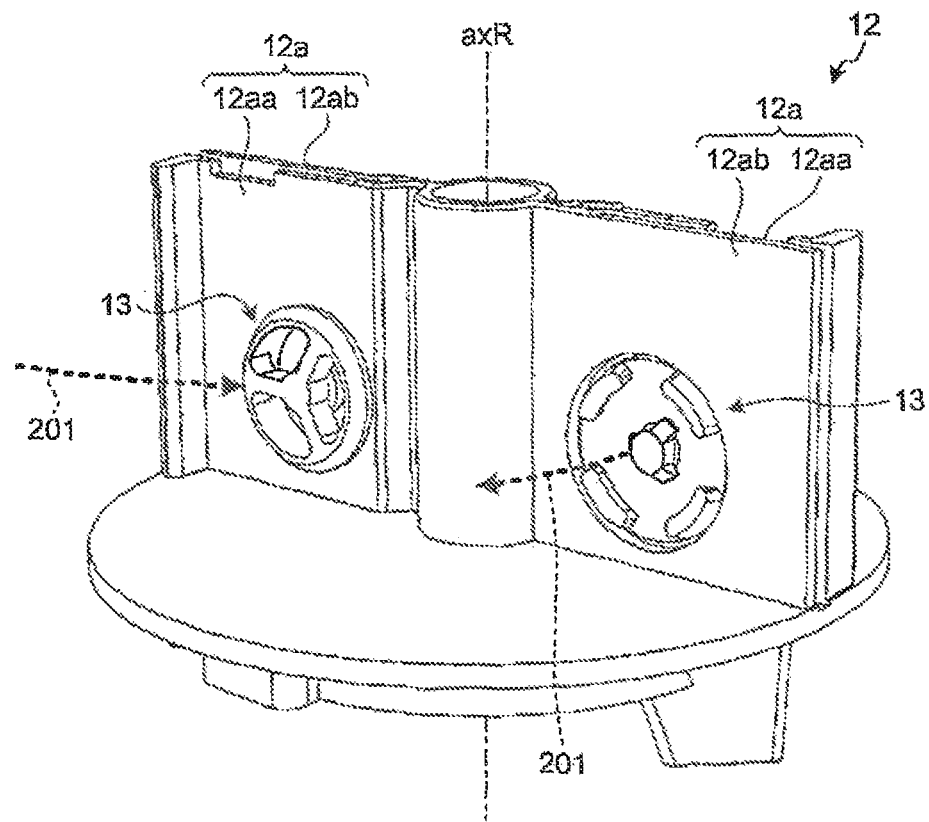
FIG. 2A is a perspective view illustrating a configuration of a rotation part.
Figure 2B:
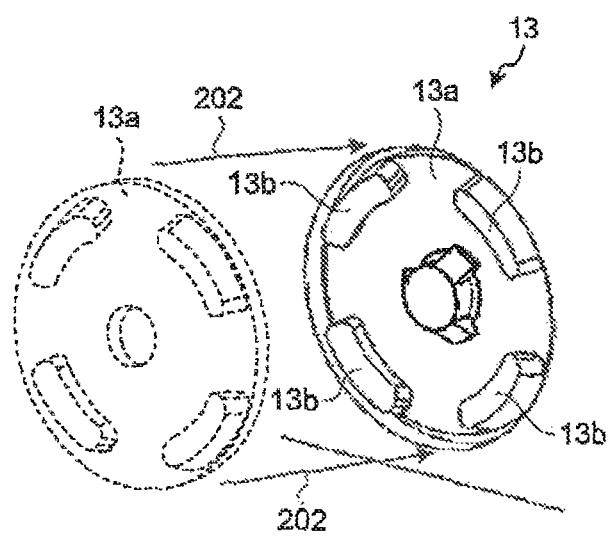
FIG. 2B is a perspective view illustrating a configuration of one of intake valves.
Figure 2C:
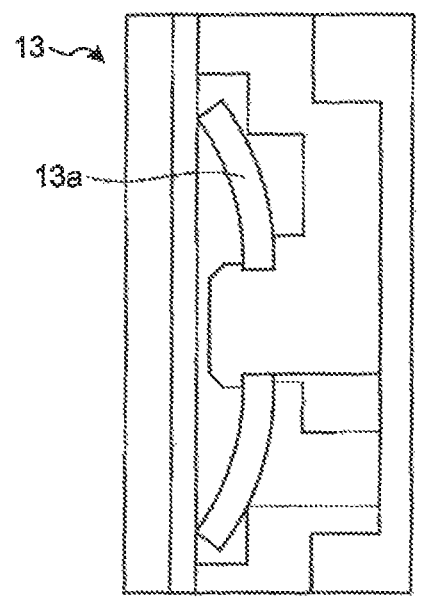
FIG. 2C is a lateral-cross-sectional view illustrating one of the intake valves.

As illustrated in FIG. 2A, the rotation part 12 includes the intake valves 13 on respective wall surfaces of the two vanes 12a. As illustrated in FIG. 2A, among wall surfaces of each of the vanes 12a, a surface on a side not in contact with the cylinder wall 11a is referred to as a first wall surface 12aa. On the other hand, a surface on a side in contact with the cylinder wall 11a is referred to as a second wall surface 12ab.

Each of the intake valves 13 is a check valve and is for the passage of air in one direction indicated by an arrow 201 illustrated in FIG. 2A. In other words, the intake valves 13 allow the passage of air from the first wall surface 12aa to the second wall surface 12ab of each of the vanes 12a.

As illustrated in FIG. 2B, on the second wall surfaces 12ab side of each of the intake valves 13, a circular thin-film elastic body 13a is, for example, fitted to be attached (see arrows 202 illustrated in FIG. 2B). When the vanes 12a are rotated in a direction away from the cylinder walls 11a, the thin-film elastic bodies 13a are deflected to be opened and the intake valves 13 are opened, when the vanes 12a are rotated in a direction approaching the cylinder walls 11a, as illustrated in FIG. 2C, the thin-film elastic bodies 13a are deflected to be closed and the intake valves 13 are closed. Thus, air is able to be taken into the rooms SP when the vanes 12a are rotated in the direction away from the respective cylinder walls 11a, air is able to be exhausted from the rooms SP when the vanes 12a are rotated in the direction approaching the cylinder walls 11a.

A valve opening pressure of each of the intake valves 13 is preliminary adjusted and set to be an appropriate value in consideration of, for example, the thickness, the material, an initial deflection amount of the corresponding thin-film elastic body 13a, so that the intake valves 13 operate as described above. Furthermore, the valve opening pressure of each of the intake valves 13 is preliminary adjusted and set so as to open at the pressure that is lower than that (namely, intake resistance) needed for hypothetical intake from the nozzle 5 to the cylinder 11.

Thus, it is possible to prevent erroneous intake from the nozzle 5 when intake is performed by using the intake valves 13, and thus it is further possible to prevent an extraneous matter other than air from entering the cylinder 11 from the nozzle 5. Therefore, a malfunction caused by entrance of the extraneous matter is able to be prevented, and thus it is possible to ensure excellent air-compression performance.

As illustrated in FIG. 2B, for example, protruded four ribs 13b are arranged along the outer periphery of each of the thin-film elastic bodies 13a.

The sizes of protruded amounts of these ribs 13b are set so that the ribs 13b are in contact with the cylinder walls 11a before the second wall surfaces 12ab when the second wall surfaces 12ab of the vanes 12a are in contact with the cylinder walls 11a.

Thus, the ribs 13b is able to absorb, while elastically deforming, an impact when the vanes 12a are coming into contact with the cylinder walls 11a, and thus it is possible to reduce sounds generated by the contact between the vanes 12a and the cylinder walls 11a. Moreover, it is possible to delay progress in aged deterioration by the impact absorption. No impact absorbing material is to be provided additionally.

As illustrated in FIG. 23, the plurality of ribs 13b is provided, and thus the thin-film elastic bodies 13a are able to be easily elastically deformed when the vanes 12a come into contact with the cylinder walls 11a.

Figure 2D:
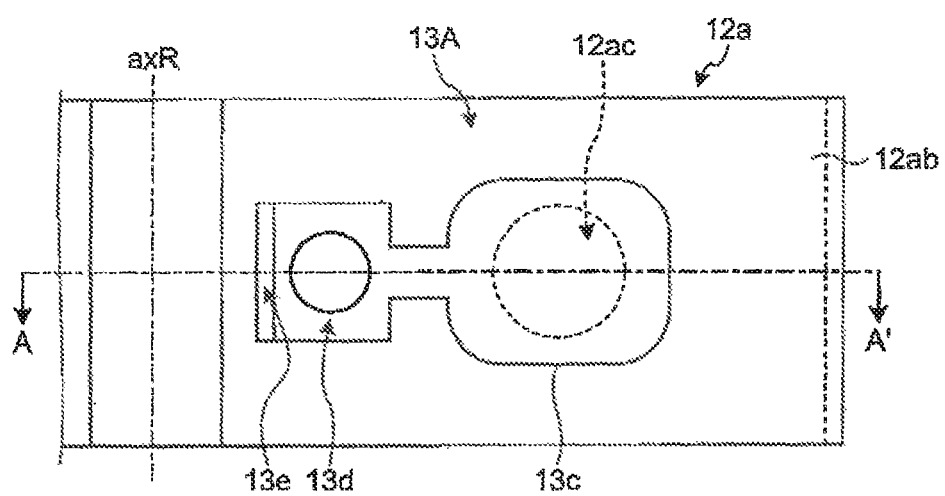
FIGS. 2D and 2E are diagrams illustrating a configuration of one of intake valves according to a modification.
Figure 2E:
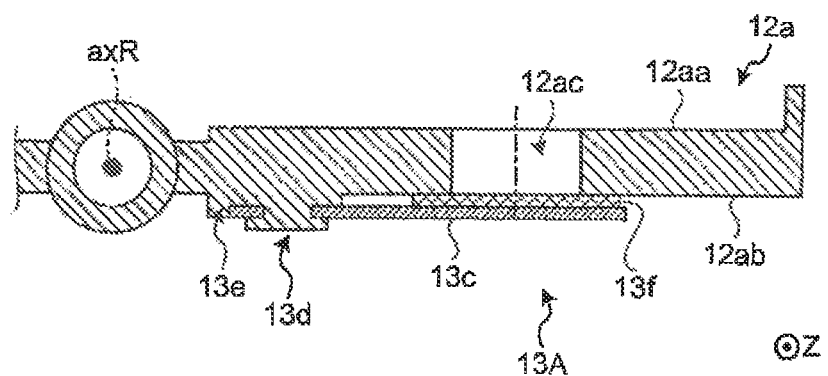

In FIGS. 2A to 2C, the case is illustrated in which each of the intake valves 13 has a circular-valve structure, alternatively, may have a reed-valve structure, for example. This modification is illustrated in FIGS. 2D and 2E. FIGS. 2D and 2E are diagrams illustrating a configuration of one of intake valves 13A according to the modification. FIG. 2E is a schematic cross-sectional view taken along a line A-A' illustrated in FIG. 2D.

As illustrated in FIGS. 2D and 2E, each of the intake valves 13A is able to be provided as a reed-valve structure including a plate-shaped opening-closing valve. In this case, through holes 12ac are opened through the respective vanes 12a, which penetrate the first wall surfaces 12aa and the second wall surfaces 12ab.

The second wall surfaces 12ab side of each of these through holes 12ac is covered by a corresponding plate-shaped elastic body (for example, plate spring) 13c. One end of the plate-shaped elastic body 13c is fixed to the vane 12a by using a caulking part 13d and a rotation locking part 13e, for example.

An elastic body 13f for sealing, which is pasted on the plate-shaped elastic body 13c, is provided between the through hole 12ac and the plate-shaped elastic body 13c.

In this modification, when the vanes 12a are rotated in the direction away from the cylinder walls 11a, the plate-shaped elastic bodies 13c are deflected to open the through holes 12ac, whereby the intake valves 13A are also able to be opened. When the vanes 12a are rotated in the direction approaching the cylinder walls 11a, the plate-shaped elastic bodies 13c are deflected to close the through holes 12ac, whereby the intake valves 13A are also able to be closed.

Next, a flow of the intake and exhaustion in the air compressing part 10 caused by the configuration described above will be explained step-by-step. For convenience of explanation, one of the above two-segmented cylinder chambers CC is referred to as a "cylinder chamber CC1" and outline of intake and exhaustion in this cylinder chamber CC1 will be explained. The same applies to the other of the above two-segmented cylinder chambers CC.

Figure 3A:
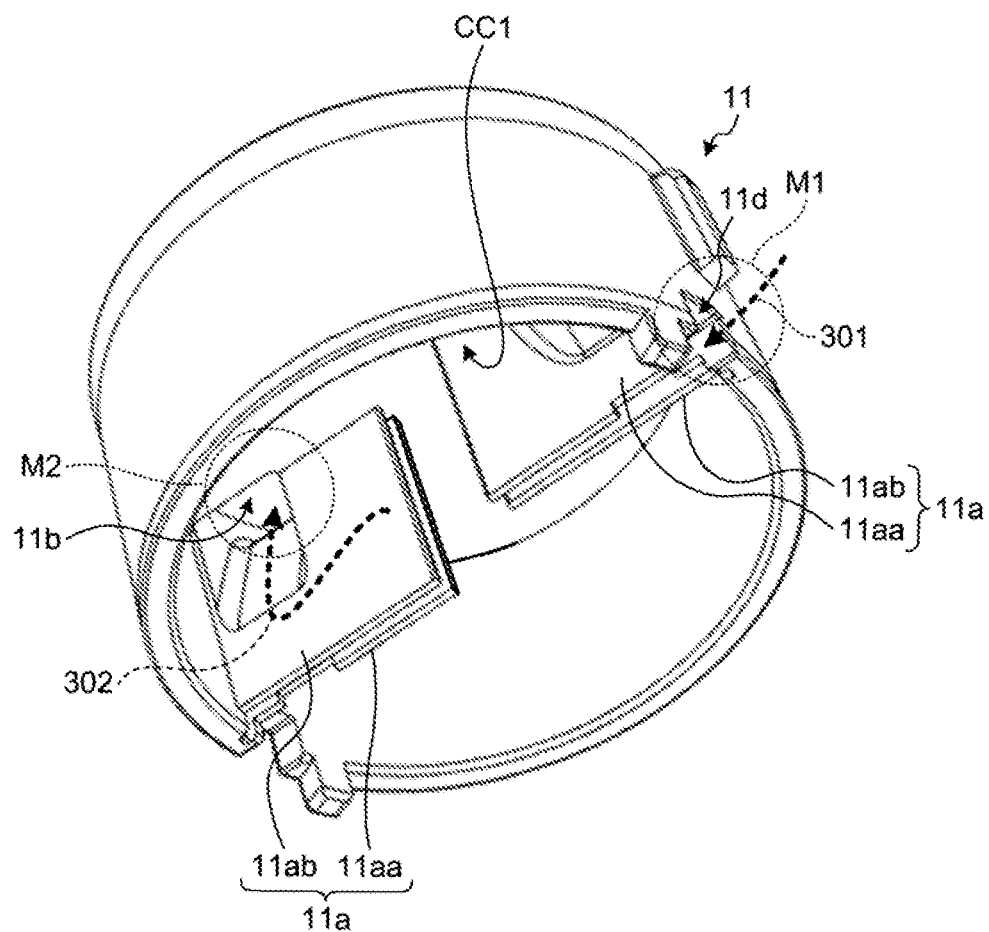
FIGS. 3A and 3B are diagrams illustrating outline of intake and exhaustion in one of cylinder chambers.
Figure 3B:
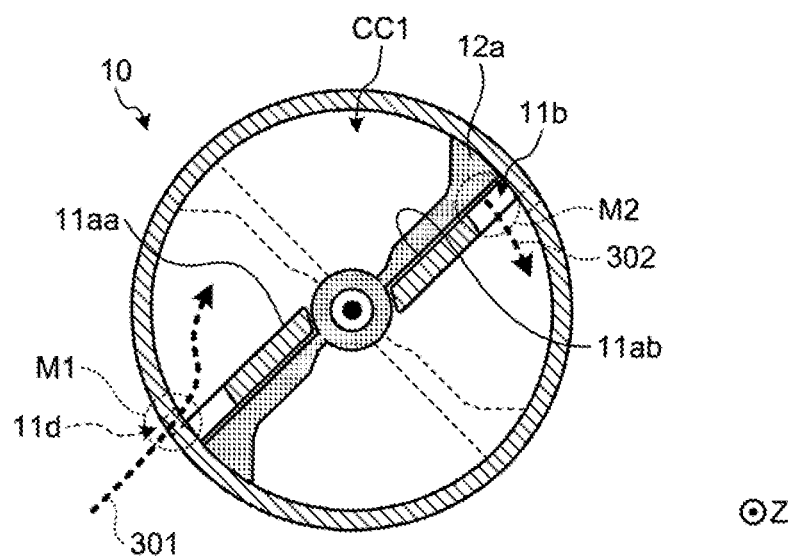

FIGS. 3A and 3B are diagrams illustrating outline of intake and exhaustion in the one cylinder chamber CC1. Similarly to the case of the aforementioned vanes 12a, as illustrated in FIGS. 3A and 3B, a surface on a side not in contact with the vane 12a among wall surfaces of each of the cylinder walls 11a is referred to as a "first wall surface 11aa". On the other hand, a surface on a side in contact with the vane 12a among wall surfaces of each of the cylinder walls 11a is referred to as a "second wall surface 11ab".

As indicated by a part M1 illustrated in FIGS. 3A and 3B, the one intake port 11d is opened in the one cylinder chamber CC1 of the cylinder 11. The fact is already described that the intake ports 11d is opened so that the outside of the cylinder 11 is communicated with the cylinder chamber CC1, more specifically, the intake port 11d is opened so that the cylinder chamber CC1, which includes the first wall surface 11aa of the cylinder wall 11a, and the outside of the cylinder 11 are communicated with each other.

Similarly as indicated by a part M2, the one communication opening 11b is opened in the one cylinder chamber CC1 of the cylinder 11. The fact is already described that the communication opening 11b is opened in a ceiling part of the cylinder chamber CC1 near the cylinder wall 11a so that the outside of the cylinder 11 is communicated with the cylinder chamber CC1.

More specifically, the communication opening 11b is opened so as to be communicated with the second wall surface 11ab of the other cylinder wall 11a that is in the other segmented chamber not communicated with the intake port 11d. As illustrated in FIG. 3B, the communication opening 11b is opened so as be shut from the cylinder chamber CC1 by the vane 12a when the vanes 12a are in contact with the second wall surfaces 11ab immediately after exhaustion (before intake).

By employing the intake ports 11d and the communication openings 11b that are formed in this manner, as illustrated in FIGS. 3A and 3B, the cylinder chambers CC1 are able to take therein air outside of the cylinder 11 from the intake ports 11d (see arrow 301 illustrated in FIGS. 3A and 3B). The taken able to be exhausted from the communication openings 11b without leakage after compression caused by rotation of the vanes 12a (see arrow 302 illustrated in FIGS. 3A and 3B).

A specific flow of the intake and exhaustion of the air compressing part 10, which is based on the aforementioned, is illustrated in FIG. 3C. FIG. 3C is a diagram illustrating a specific flow of intake and exhaustion of the air compressing part 10.

First, as illustrated in FIG. 3C, in a state of "before intake", the air compressing part 10 is in a state where the vanes 12a are in contact with the cylinder walls 11a.

When the vanes 12a are rotated, from this state of "before intake", around the rotation axis axR in the predetermined direction away from the cylinder walls 11a (see arrows 303 illustrated in FIG. 3C), the rooms SP between the vanes 12a and the cylinder walls 11a are expanded by this separation. Here the "predetermined direction" is defined to be a left-hand turn (counterclockwise) on the sheet of FIG. 3C.

Thus, as indicated by arrows 304 illustrated in FIG. 3C, the negative pressure is generated in the rooms SP, air outside of the cylinder 11 is taken through the intake ports 11d, and air is taken into the rooms SP through the intake valves 13 ("intake").

When the vanes 12a are rotated, from this state of "intake", around the rotation axis axR in a direction (namely, clockwise) reverse to the above predetermined direction (see arrows 305 illustrated in FIG. 3C), the vanes 12a approach the cylinder walls 11a so as to contract the rooms SP. In this time, the intake valves 13 are closed and do not leak the air that is taken into the rooms SP ("intake" has performed). Thus, the air that is taken into the rooms SP ("intake" has performed) is compressed to generate compressed air.

The generated compressed air is rotated around the rotation axis axR until the vanes 12a return to a state where the vanes 12a are in contact with the cylinder walls 11a so as to be pushed and "exhausted" from the communication openings 11b (see arrows 306 illustrated in FIG. 3C).

Here the case is explained in which the intake valves 13 are arranged on the wall surfaces of the vanes 12a in the cylinder chamber CC, the intake valves 13 may be arranged on wall surfaces of, not the vanes 12a, but the cylinder walls 11a.

This case will be explained with reference to FIG. 4. FIG. 4 is a diagram illustrating a specific flow of intake and exhaustion of the air compressing part 10 when the intake valves 13 are arranged in the cylinder walls 11a. FIG. 4 corresponds to FIG. 3C, and thus there may exist an explanation part that is duplicated with the aforementioned.

When arranged on wall surfaces of the cylinder walls 11a, the intake valves 13 are provided to allow the passage of air in one direction from the first wall surfaces 11aa not in contact with the vanes 12a to the second wall surfaces 11ab to be in contact with the vanes 12a.

As illustrated in FIG. 4, it is assumed that the intake valves 13 are provided in, not the vanes 12a, but the cylinder walls 11a. In this case, in a state of "before intake", the air compressing part 10 is in a state where the vanes 12a are in contact with the cylinder walls 11a.

When the vanes 12a are rotated, from this state of "before intake", around the rotation axis axR in the predetermined direction away from the cylinder walls 11a (see arrows 401 illustrated in FIG. 3C), the rooms SP between the vanes 12a and the cylinder walls 11a are expanded by this separation.

Thus, as indicated by arrows 402 illustrated in FIG. 4, the negative pressure is generated in the rooms SP, air outside of the cylinder 11 is taken from the intake ports 11d, and air is taken into the rooms SP through the intake valves 13 ("intake"). As indicated by arrows 403 illustrated in FIG. 4, air in the cylinder chamber CC is taken into the rooms SP through the intake valves 13 ("intake").

When the vanes 12a are rotated, from this state of "intake", around the rotation axis axR in the direction reverse to the above predetermined direction (see arrows 404, illustrated in FIG. 4), the vanes 12a approach the cylinder walls 11a to contract the rooms SP. In this time, the intake valves 13 are closed and do not leak the air that is taken into the rooms SP ("intake" has performed). Thus, the air that is taken into the rooms SP ("intake" has performed) is compressed to generate compressed air.

The generated compressed air is rotated around the rotation axis axR until the vanes 12a return to a state where the vanes 12a are in contact with the cylinder walls 11a so as to be pushed and "exhausted" from the communication openings 11b (see arrows 405 illustrated in FIG. 4).

As described above, the air compressing part 10 (corresponding to one example of "air compressor") according to the present embodiment is an air compressing part that includes the cylinder 11 and the rotation part 12 (corresponding to one example of "rotating body") provided to be rotatable around the cylinder chamber CC in the cylinder 11 so as to generate compressed air through intake and exhaustion caused by rotation of the rotation part 12, and includes the intake valve 13, 13A. The intake valve 13, 13A takes air in the intake and exhaustion. The intake valve 13, 13A is provided in the cylinder 11.

Therefore, by employing the air compressing part 10 according to the present embodiment, it is possible to ensure excellent air-compression performance by a simple configuration.

Other Embodiment

Meanwhile, in the aforementioned embodiment, the example is explained, in which the communication openings 11b for exhausting a compressed air are provided in the ceiling part of the cylinder chamber CC and the compressed air exhausted from this communication openings 11b is led to the nozzle 5 through the flow path 11c.

The flow of the intake and exhaustion including this exhaust route is not limited to the example according to the aforementioned embodiment. Therefore, this other embodiment will be explained with reference to FIGS. 5A to 5C.

Figure 5A:
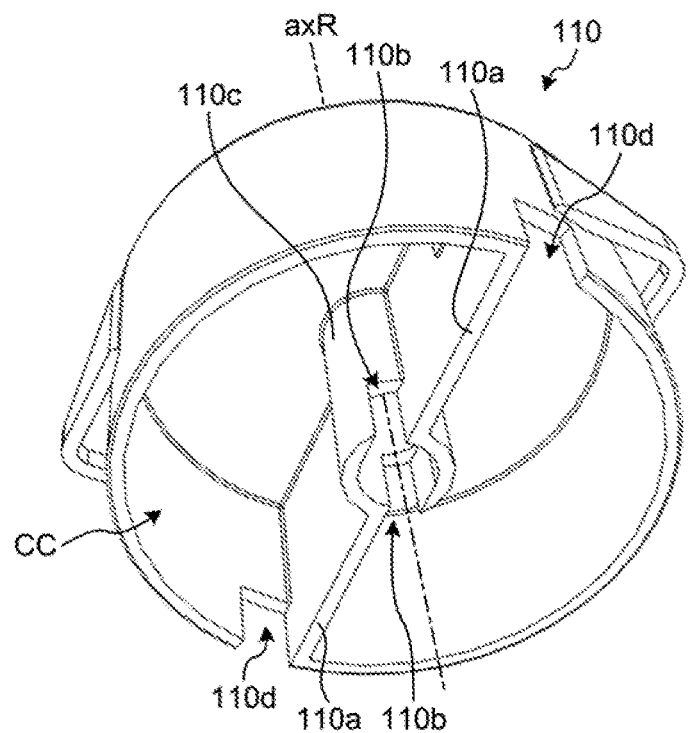
FIG. 5A is a perspective view illustrating a configuration of a cylinder according to another embodiment.
Figure 5B:
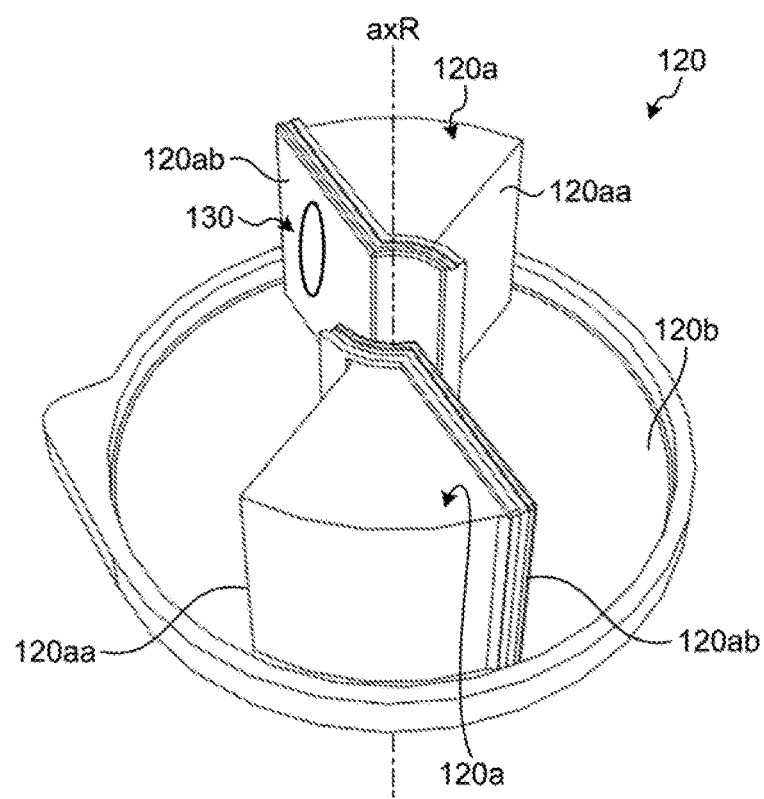
FIG. 5B is a perspective view illustrating a configuration of a rotation part according to the other embodiment.

FIG. 5A is a perspective view illustrating a configuration of a cylinder 110 according to another embodiment. FIG. 5B is a perspective view illustrating a configuration of a rotation part 120 according to the other embodiment.

As illustrated in FIG. 5A, the cylinder 110 according to the other embodiment includes cylinder walls 110a, communication openings 110b, a shaft part 110c, and intake ports 110d. The cylinder walls 110a corresponding to the aforementioned cylinder walls 11a, each of which is formed in a plate-like shape, for example, are arranged so as to segment, along a substantially radial direction, the cylindrical cylinder chamber CC in positions to be point symmetry with the rotation axis axR as the center point.

The shaft part 110c corresponding to the aforementioned shaft part 12c of the rotation part 12 is a shaft portion for the rotation around the rotation axis axR, and is arranged between the two cylinder walls 110a so as to link the cylinder walls 110a.

The shaft part 110c has a hollow structure and is connected with the nozzle 5 on the axis line of the rotation axis axR. The communication openings 110b corresponding to the aforementioned communication openings 11b are different from the communication openings 11b, and are provided by cutting, on a side in contact with the rotation part 120, two openings from the shaft part 110c so that each of the segmented cylinder chambers CC and a hollow part of the shaft part 110c are communicated with each other.

As illustrated in FIG. 5B, the rotation part 120 according to the other embodiment includes vanes 120a and a rotation base 120b. The vanes 120a corresponding to the aforementioned vanes 12a are arranged on the rotation base 120b so as to be point symmetry with the rotation axis axR as the center point. Each of the vanes 120a includes a first wall surface 120aa on a side that is not in contact with the corresponding cylinder wall 110a and a second wall surface 120ab on a side that is to be in contact with the corresponding cylinder wall 110a.

Intake valves 130 are provided in wall surfaces of the second wall surfaces 120ab. The intake valves 130 correspond to the aforementioned intake valves 13. Not illustrated in FIG. 5B, each of the vanes 120a has a hollow structure, bottoms of the vanes 120a are opened, and is communicated with the outside of the rotation pert 120 through the rotation base 120b.

The intake valves 130 are provided so as to allow the passage of air from the inside of these vanes 120a to the outside of the second wall surfaces 120ab. The rotation base 120b corresponding to the aforementioned rotation base 12b is formed in a substantially round-plate-like shape so as to be provided to be rotatable around the rotation axis axR. The cylinder 110 and the rotation part 120 are engaged with each other, so that an sir compressing part 100 according to the other embodiment is configured.

Next, a more specific flow of intake and exhaustion of the air compressing part 100 according to the other embodiment will be explained with reference to FIG. 5C. FIG. 5C is a diagram illustrating the specific flow of intake and exhaustion of the air compressing part 100 according to the other embodiment.

First, as illustrated in FIG. 5C, in a state of "before intake", the air compressing part 100 is in a state where the vanes 120a are in contact with the cylinder walls 110a.

When the vanes 120a are rotated, from this state of "before intake", around the rotation axis axR in the predetermined direction away from the cylinder walls 110a (see arrows 501 illustrated in FIG. 5C), the rooms SP between the vanes 120a and the cylinder walls 110a are expanded by this separation. Here the "predetermined direction" is defined to be a right-hand turn (clockwise) on the sheet of FIG. 5C.

Thus, as indicated by arrows 502 illustrated in FIG. 5C, the negative pressure is generated in the rooms SP, air outside of the cylinder 110 is taken into the rooms SP through the intake valves 130 ("intake").

When the vanes 120a are rotated, from this state of "intake", around the rotation axis ax R in a direction (namely, counterclockwise) reverse to the above predetermined direction (see arrows 503 illustrated in FIG. 5C), the vanes 120a approach the cylinder walls 110a to contract the rooms SP. In this case, the intake valves 130 are closed, and do not vent the air that has been taken into the rooms SP ("intake" is performed). Thus, the air that has been taken into the rooms SP ("intake" is performed) is compressed to generate a compressed air.

The generated compressed air is pushed and "exhausted" from the communication openings 110b caused by the rotation of the vanes 120a around the rotation axis axR until the vanes 120a return to a state of being in contact with the cylinder walls 110a (see arrows 504 illustrated in FIG. 5C). Air outside of the intake ports 11d is taken by this movement of the vanes 120a (see arrows 505 illustrated in FIG. 5C).

By employing the configuration according to the other embodiment, the compressed air is generated without arranging any check valve between the nozzle 5 and the cylinder chamber CC while preventing an extraneous matter from entering from the nozzle 5. In other words, by employing the air compressing part 100 according to the other embodiment, it is possible to ensure excellent air-compression performance by a simple configuration.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An air compressor comprising:
   a cylinder;
   a rotating body that is inside of the cylinder and that is rotatable around a rotation axis;
   intake valves located inside of the cylinder to take air; and
   a nozzle extending from the cylinder, wherein
   the cylinder includes:
      a cylinder chamber that houses the rotating body and is formed in a cylindrical shape; and
      two cylinder walls that (i) are plate-shaped and (ii) are arranged so as to segment the cylinder chamber along a substantially radial direction of the cylinder chamber and at positions that are in point symmetry with the rotation axis as a center point;
   the rotating body includes:
      a rotation base that is round-plate-shaped and is rotatable around the rotation axis; and two vanes that are arranged on the rotation base so as to be in point symmetry with the rotation axis as a center point;

the intake valves are check valves and are provided in respective ones of the vanes so that each of the intake valves penetrates the corresponding vane in a rotation direction of the vanes;

the nozzle is configured to communicate with the intake valves so as to eject compressed air obtained by compressing air between the vanes and the cylinder walls;

the intake valves are opened when the vanes are rotated in a direction away from the respective cylinder walls and are closed when the vanes are rotated in a direction approaching the respective cylinder walls; and a valve opening pressure of each of the intake valves is lower than an intake resistance of air via the nozzle into an inside of the cylinder.

2. The air compressor according to claim 1, wherein the rotating body takes air by rotation of the vanes in the direction away from the respective cylinder walls to expand a room between each vane and the corresponding cylinder wall, and exhausts compressed air by rotation of the vanes in the direction approaching the respective cylinder walls to compress the rooms, each of the vanes includes a first wall surface and a second wall surface, the first wall surface being a wall surface that does not face a corresponding one of the rooms and the second wall surface being a wall surface that faces the corresponding room, and each of the intake valves allows passage of air in one direction from the corresponding first wall surface to the corresponding second wall surface.

3. The air compressor according to claim 2, wherein the intake valves include respective thin-film elastic bodies that are arranged on the second wall surfaces, the thin-film elastic bodies being provided so as to deflect to be opened when the vanes are rotated in the direction away from the respective cylinder walls and to deflect to be closed when the vanes are rotated in the direction approaching the respective cylinder walls.

4. The air compressor according to claim 2, further comprising:

intake ports through which air outside of the cylinder is taken into the cylinder chamber; and exhaust ports through which the compressed air is exhausted to outside of the cylinder chamber, wherein each of the intake ports is opened on an outer wall of the cylinder so that (i) one of multiple segmented chambers formed by the two cylinder walls that includes a first wall surface of the corresponding cylinder wall, the first wall surface not facing the corresponding room, and (ii) the outside of the cylinder are in communication with each other, and each of the exhaust ports is opened to be in communication with a second wall surface of the other cylinder wall facing the corresponding room, and to be shut from the cylinder chamber by the corresponding vane when the vanes are in contact with the second wall surfaces of the cylinder walls.

5. An extraneous-matter removing apparatus comprising: the air compressor according to claim 1, wherein the extraneous-matter removing apparatus ejects, to an optical sensor, the compressed air generated by the air compressor to remove an extraneous matter adhered to the optical sensor.

6. The extraneous-matter removing apparatus according to claim 5, wherein the optical sensor includes an on-vehicle camera provided in a vehicle.

7. An air compressor comprising:

a cylinder;

a rotating body that is inside of the cylinder and that is rotatable about a rotation axis; and intake valves located inside the cylinder to take air, wherein the cylinder includes:

a cylinder chamber that houses the rotating body and is formed in a cylindrical shape; and two cylinder walls that (i) are plate-shaped and (ii) are arranged so as to segment the cylinder chamber along a substantially radial direction of the cylinder chamber and at positions that are in point symmetry with the rotation axis as a center point;

the rotating body includes:

a rotation base that is formed in a round-plate shape and is configured to be rotatable around the rotation axis; and two vanes that are arranged on the rotation base so as to be in point symmetry with the rotation axis as a center point;

the intake valves are provided in the respective vanes;

the rotating body takes air by rotation of the vanes in a direction away from the respective cylinder walls to expand a room between each vane and the corresponding cylinder wall, and exhausts compressed air by rotation of the vanes in a direction approaching the respective cylinder walls to compress the rooms;

each of the cylinder walls and the vanes includes a first wall surface and a second wall surface, each of the first wall surfaces being a wall surface that does not face a corresponding one of the rooms and each of the second wall surfaces being a wall surface that faces the corresponding room, the first wall surface of each cylinder wall being configured not to contact the first wall surface of the corresponding vane, the second wall surface of each cylinder wall being configured to contact the second wall surface of the corresponding vane;

each of the intake valves allows passage of air in one direction from the first wall surface of the corresponding vane in which the intake valve is provided to the second wall surface of the corresponding vane in which the intake valve is provided;

the intake valves include respective thin-film elastic bodies that are arranged on the second wall surfaces of the vanes in which the intake valves are provided, the thin-film elastic bodies being provided so as to deflect to be opened when the vanes are rotated in the direction away from the respective cylinder walls and to deflect to be closed when the vanes are rotated in the direction approaching the respective cylinder walls; and each of the thin-film elastic bodies includes one or more protrusion parts that are configured to contact the corresponding cylinder wall prior to the second wall surface of the corresponding vane contacting the corresponding cylinder wall when the second wall surface of the corresponding vane rotates to contact the corresponding cylinder wall.

8. The air compressor according to claim 7, wherein the one or more protrusion parts are arranged along an outer periphery of each of the thin-film elastic bodies.

* * * * *